United States Patent Office.

WILLIAM ROSS, OF DAY'S STORE, PENNSYLVANIA.

Letters Patent No. 60,942, dated January 1, 1867.

IMPROVEMENT IN PRESERVING BUTTER, MEAT, &c.

*The Schedule referred to in these Letters Patent and making part of the same.*

TO ALL WHOM IT MAY CONCERN:

Be it known that I, WILLIAM ROSS, of Day's Store, in the county of Greene, and State of Pennsylvania, have invented a new and improved Chemical Preparation for Preserving Butter and Meats; and I do hereby declare that the following is a full, clear, and exact description thereof, which will enable others skilled in the art to fully understand and make use of the same.

My invention consists in a chemical preparation intended for a preservation of butter to prevent its becoming strong and rancid, of fresh meats to prevent putrefaction and to prevent the same from receiving a salty and strong taste, as when preserved by salt only.

My chemical preparation is composed of the following ingredients, in about the proportion as follows: Common salt, 12 parts; saltpetre, 3 parts; loaf sugar, 4 parts; soda, 1 part; water, 137 parts.

The above, when thoroughly mixed together, can be kept in a bottle, and will thus be ready for use whenever occasion requires, and it will be found to be an excellent preservative for preventing butter becoming strong and rancid, and also an excellent article to prevent meats from putrefying.

What I claim as new, and desire to secure by Letters Patent, is—

A chemical preparation for preserving butter and meats, composed of the ingredients and in about the proportions substantially as herein specified.

WILLIAM ROSS.

Witnesses:
  GEO. S. ADAMS,
  A. D. HAIL.